United States Patent
Wroblewski et al.

(10) Patent No.: US 10,215,200 B2
(45) Date of Patent: Feb. 26, 2019

(54) ELECTROHYDRAULIC CONTROL VALVE

(71) Applicant: Danfoss Power Solutions ApS, Nordborg (DK)

(72) Inventors: Dirk Wroblewski, Flensburg (DE); Kjeld Ravn, Sydals (DK)

(73) Assignee: Danfoss Power Solutions ApS, Nordborg (DK)

(*) Notice: Subject to any disclaimer, the term of this patent is extended or adjusted under 35 U.S.C. 154(b) by 800 days.

(21) Appl. No.: 14/594,265

(22) Filed: Jan. 12, 2015

(65) Prior Publication Data

US 2015/0198182 A1    Jul. 16, 2015

(30) Foreign Application Priority Data

Jan. 13, 2014  (EP) ..................................... 14150956

(51) Int. Cl.
  *F15B 13/04*   (2006.01)
  *F15B 13/043*  (2006.01)
  *F16K 31/42*   (2006.01)

(52) U.S. Cl.
  CPC ...... *F15B 13/0433* (2013.01); *F15B 13/0402* (2013.01); *F16K 31/423* (2013.01); *Y10T 137/8671* (2015.04); *Y10T 137/86614* (2015.04)

(58) Field of Classification Search
  CPC .............. F15B 13/0402; F15B 13/0817; F15B 13/0825; F15B 13/0832; F15B 13/0857;

(Continued)

(56) References Cited

U.S. PATENT DOCUMENTS 2,616,449 A * 11/1952 Maha .................... F16K 31/423
                                                                        251/30.01
2,624,585 A *  1/1953 Churchill .............. F16K 31/423
                                                                        137/596.16

(Continued)

FOREIGN PATENT DOCUMENTS

CN           1162348 A     10/1997
DE      202004014520 U1    11/2004

(Continued)

OTHER PUBLICATIONS

European Search Report Serial No. EP14150956 dated Jun. 30, 2014.

*Primary Examiner* — Craig J Price
(74) *Attorney, Agent, or Firm* — McCormick, Paulding & Huber LLP

(57) ABSTRACT

An electrohydraulic control valve (1) comprising a control valve element (2) displaceable in a first direction by a pressure in a first pressure chamber (5) and in a second direction by a pressure in a second pressure chamber (6). Each pressure chamber (5, 6) is connected to a line between a high pressure port (PP) and a low pressure port (PT) via a magnetic valve (11, 12). Each magnetic valve (11, 12) is a three-way valve and comprises a first valve seat (17) and a second valve seat (18). A space (19) between the first valve seat (17) and the second valve seat (18) is connected to the pressure chamber (5, 6) and a first valve element (20) positioned outside the space (19) cooperates with the first valve seat (17) and a second valve element (21) positioned outside the space (19) cooperates with the second valve seat (18).

18 Claims, 3 Drawing Sheets

(58) Field of Classification Search
CPC .............. F15B 13/0864; F15B 13/0875; F15B 13/0433; F16K 31/423; Y10T 137/86614; Y10T 137/8671; Y10T 137/87193; Y10T 137/87209; Y10T 137/87217; Y10T 137/87635
USPC ................... 137/596.14, 596.16, 596.17, 884
See application file for complete search history.

(56) References Cited

U.S. PATENT DOCUMENTS

| | | | | |
|---|---|---|---|---|
| 2,732,860 A | * | 1/1956 | Ray | F15B 13/0431 137/625.64 |
| 2,853,976 A | * | 9/1958 | Gerwig | F16K 31/426 137/625.48 |
| 3,191,626 A | * | 6/1965 | Leibfritz | F15B 13/0431 137/625.48 |
| 3,229,588 A | * | 1/1966 | Czernek | F15B 9/08 137/625.27 |
| 3,736,958 A | | 6/1973 | Rostad | |
| 4,391,292 A | * | 7/1983 | Millar | F16K 11/048 137/269 |
| 4,610,267 A | * | 9/1986 | Beck | F16K 11/048 137/596.17 |
| 5,018,431 A | * | 5/1991 | Gray | F15B 13/043 137/596.17 |
| 5,165,320 A | * | 11/1992 | Ravn | F15B 11/006 91/31 |
| 5,354,123 A | * | 10/1994 | Albert | B60T 8/3635 137/596.16 |
| 5,669,406 A | * | 9/1997 | Gluf, Jr. | F16K 31/0637 137/270 |

FOREIGN PATENT DOCUMENTS

| | | |
|---|---|---|
| DE | 102005043458 A1 | 3/2007 |
| DE | 102006049012 A1 | 4/2008 |
| EP | 0 110 126 A1 | 6/1984 |
| FR | 1565128 A | 4/1969 |
| GB | 2008721 B | 2/1982 |
| GB | 2263154 A | 7/1993 |

* cited by examiner

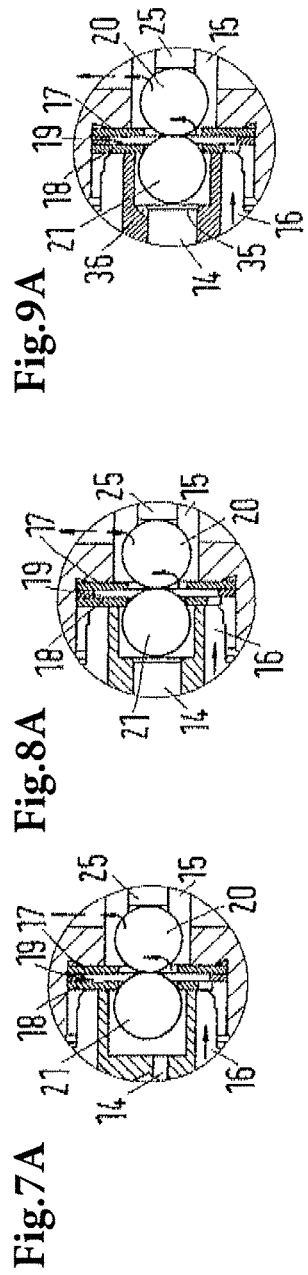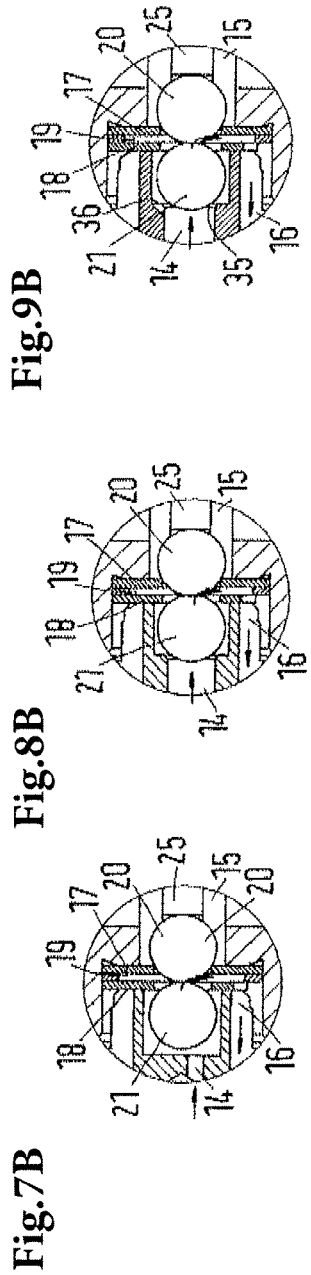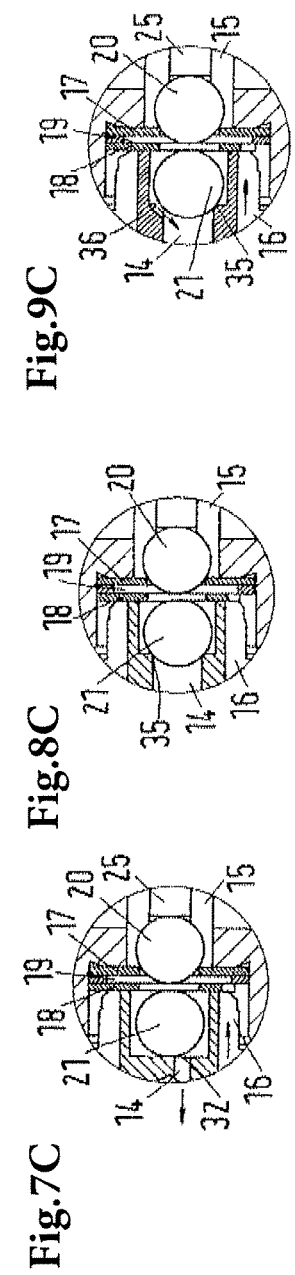

ELECTROHYDRAULIC CONTROL VALVE

CROSS REFERENCE TO RELATED APPLICATION

Applicant hereby claims foreign priority benefits under U.S.C. § 119 from European Patent Application No. EP14150956 filed on Jan. 13, 2014, the contents of which are incorporated by reference herein.

TECHNICAL FIELD

The present invention relates to an electrohydraulic control valve comprising a valve element that is displaceable in a first direction by a pressure in a first pressure chamber and in a second direction by a pressure in a second pressure chamber, each pressure chamber being connected to a line between a high pressure port and a low pressure port via a magnetic valve.

BACKGROUND

Such a control valve is, for example, known from DE 10 2005 043 458 B4. The high pressure port is connected to a proportional valve. The proportional valve is connected to a changeover valve having two outputs, each output being connected to one of the pressure chambers. The proportional valve allows to adjust the pressure coming from the high pressure port. The changeover valve is meant to direct said pressure coming from the proportional valve to one of the pressure chambers. Depending on which pressure chamber is supplied with the higher pressure from the proportional valve the valve element will be moved in one of the two directions until an equilibrium between the pressure force and a force of a spring is reached. Each pressure chamber is also connected to one of two two-way magnetic valves, wherein both two-way magnetic valves lead to a low pressure supply and, when opened, allow hydraulic fluid to escape from the pressure chamber to the low pressure port.

For a hydraulic valve arrangement it is often required that a control valve cannot just be adjusted manually but also remotely. To this end the valve element is charged with a pressure depending upon the desired direction in which the valve element shall be moved. A pressure may then be maintained until the valve element has reached the desired position.

This functionality can be achieved in several ways. First of all one may connect both pressure chambers to two magnetic valves each. For each pressure chamber one magnetic valve may be connected to the high pressure port and one other magnetic valve will be connected to the low pressure port. In order to move the valve element one of the two pressure chambers will then be charged with a higher pressure by opening the corresponding magnetic valve leading to the high pressure port. At the same time the other pressure chamber will be charged with a lower pressure by opening the corresponding magnetic valve leading to the low pressure port. The two magnetic valves stay open until the valve element has reached the desired position.

Such a valve arrangement is reliable but requires four magnetic valves and the corresponding control parts. Consequently, the production costs are relatively high.

SUMMARY

The object underlying the invention is to provide an electrohydraulic control valve that is reliable and of simple construction.

This object is solved with an electrohydraulic control valve mentioned above in that each magnetic valve is a three-way valve and comprises a first valve seat and a second valve seat, a space between said first valve seat and said second valve seat being connected to said pressure chamber, and a first valve element positioned outside said space cooperates with said first valve seat and a second valve element positioned outside said space cooperates with said second valve seat.

In such a control valve the valve element can be displaced in two opposite directions by means of a difference between the pressures in the two pressure chambers. The pressure in each pressure chamber can be adjusted by means of the three-way magnetic valve. A three-way magnetic valve has a first port connected to the high pressure port, a second port connected to the low pressure port, and a third port connected to the chamber. The two magnetic valves for the both pressure chambers are in principle equal. The two valve elements arranged outside the space allow several modes of operation as will be described below.

In a preferred embodiment said second valve element is moveable by said first valve element. In this case, the second valve element does not need an own drive.

Preferably said first valve element and said second valve element are moveable away from each other under an influence of a pressure in said space. In this case, for example, the second valve element can be moved away further from the second valve seat to reduce the flow resistance between the second valve element and the second valve seat when the first valve element has closed the first valve seat.

Preferably an orifice is arranged between said high pressure port and said second valve seat. Such an orifice can be used together with a modulation of one of the magnetic valves, i.e. an intermittently opening of this magnetic valves. In this case the valve element is moved back and forth around a desired position or set point. The orifice smoothes outer pressure pulses.

In a preferred embodiment a branch line connects said pressure chamber and said low pressure port, wherein a branch line check valve is arranged in said branch line opening towards said pressure chamber. Such a branch line check valve is of advantage in an abnormal operation, when the pressure at the low pressure port is lower than the pressure at the high pressure port.

In another preferred embodiment a bypass line connects said high pressure port and said low pressure port, wherein a bypass line check valve is arranged in said bypass line opening towards said high pressure port. The bypass line and the bypass check valve have basically the same advantage in a situation where the pressure at the low pressure port is higher than the pressure at the high pressure port.

Preferably a pressure port check valve is arranged between said magnetic valve and said high pressure port, said pressure port check valve opening towards said magnetic valve. Such a pressure port check valve is of advantage if a movement of the control valve element should be avoided once the control valve element has reached the desired position.

However, in some cases it is preferred that said pressure port check valve is bridged by a bypass orifice. In this embodiment a small movement of the control valve is possible. However, the energy consumption is lowered to a minimum.

In a preferred embodiment, in a first position, said second valve element protrudes through said second valve seat and contacts said first valve element, lifting said first valve element off said first valve seat. The second valve element can be actuated by the pressure at the high pressure port driving back the first valve element and opening a connection between the pressure chamber and the low pressure port.

Preferably, in a second position said first valve element protrudes through said first valve seat and contacts said second valve element, lifting said second valve element off said second valve seat. When the magnetic drive is actuated, the first valve element can be used to actuate the second valve element opening a connection between the pressure chamber and the high pressure port.

Preferably, in a third position, said first valve element contacts said first valve seat and said second valve element closes a connection between said pressure chamber and said high pressure port at least partly. The second valve element is double acting as part of a check valve when closing the connection between the pressure chamber and the high pressure port.

Preferably said magnetic valve comprises a coil arrangement which is supplied with modulated electric energy. In other words, the coil arrangement can be switched on or off, opening or closing the respective paths in the three-way valve.

BRIEF DESCRIPTION OF THE DRAWINGS

Preferred embodiments of the invention now will be described in more detail with reference to the drawing, wherein:

FIG. 7A shows schematically parts of a magnetic valve according to a first embodiment, in a not energized situation, FIG. 7B shows schematically parts of a magnetic valve according to a first embodiment, in an energized situation, FIG. 7C shows schematically parts of a magnetic valve according to a first embodiment, when pressure in pressure chamber is larger than the pressure at the high pressure port, FIG. 8A shows schematically parts of a magnetic valve according to a second embodiment, in a not energized situation, FIG. 8B shows schematically parts of a magnetic valve according to a second embodiment, in an energized situation, FIG. 8C shows schematically parts of a magnetic valve according to a second embodiment, when pressure in the pressure is larger than the pressure in the first port, FIG. 9A shows schematically a magnetic valve according to a third embodiment, in a not energized situation, FIG. 9B shows schematically a magnetic valve according to a third embodiment, in an energized situation, and FIG. 9C shows schematically a magnetic valve according to a third embodiment, when there is a pressure differential.

DETAILED DESCRIPTION

Figure 1:
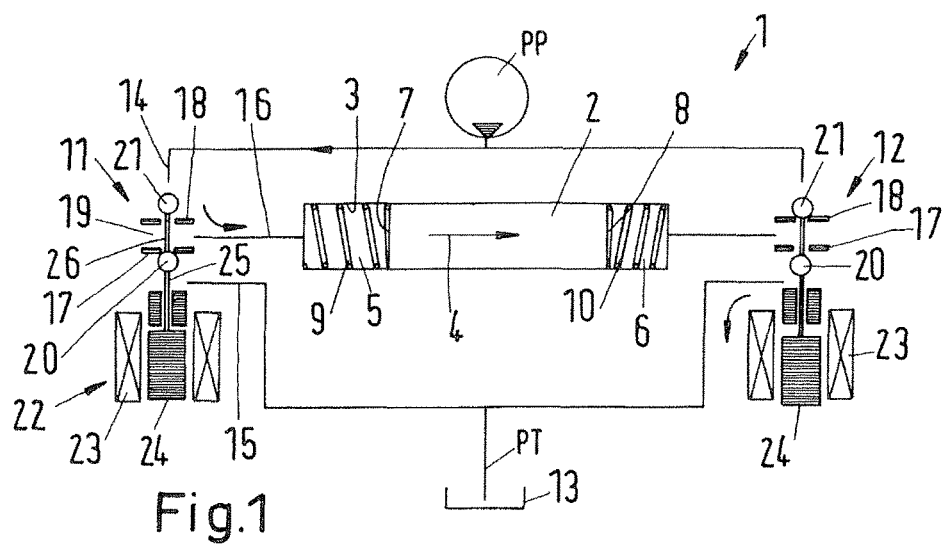
FIG. 1 is a schematic illustration of an electrohydraulic control valve.

An electrohydraulic control valve 1 as shown in FIG. 1 comprises a control valve element 2 in form of a slide displaceable in a bore 3 of a housing. The control valve element 2 is not described in detail. It may have grooves in circumferential or longitudinal direction and cooperates with other grooves, slots or openings in the inner wall of the opening 3.

The control valve 2 can be moved within the bore 3 in two opposite directions. One direction is indicated by an arrow 4.

The control valve element 2 is arranged between a first pressure chamber 5 and a second pressure chamber 6. The pressure in the first pressure chamber 5 acts on a first face 7 of the control valve element 2 and the pressure in the second pressure chamber 6 acts on a second face 8 of the control valve element 2. Depending on the pressure difference acting on the faces 7, 8 the control valve element 2 is moved within the bore 3 in longitudinal direction.

Additionally, there may be springs 9, 10 acting on the control valve element 2. The springs 9, 10 are pressure springs, i.e. they can push the control valve element 2, but they cannot pull the control valve element 2. Instead of two springs one could also imagine a solution with a double working spring.

FIG. 1 shows a situation in which the pressure in the first pressure chamber 5 exceeds the pressure in the second pressure chamber 6. The control valve element 2 will be moved in the direction indicated by the arrow 4 as long as the force generated by the pressure difference between the pressures in the pressure chambers 5, 6 is larger than the counter force generated by the spring 10. The spring 9 in the first pressure chamber 5 in this case stays uncompressed.

To adjust the pressure in the first pressure chamber 5, a first magnetic valve 11 is provided. In the same way, a second magnetic valve 12 is provided to adjust the pressure in the second pressure chamber 6. Both magnetic valves 11, 12 are arranged in a line between a high pressure port PP and a low pressure port PT. The high pressure port PP can be supplied, for example, with a pilot pressure. The low pressure port PT can be connected to a tank 13.

Both magnetic valves 11, 12 have the same constructions. Therefore, only magnetic valve 11 will be described in more detail.

The magnetic valve 11 is a three-way valve having a first port 14 connected to the high pressure port PP, a second port 15 connected to the low pressure port PT and a third port 16 connected to the pressure chamber 5. The magnetic valve 11 comprises a first valve seat 17 and a second valve seat 18. A space 19 is arranged between the two valve seats 17, 18.

A first valve element 20 cooperates with the first valve seat 17, i.e. it can contact the first valve seat 17 in order to close a connection between the space 19 and the second port 15 or it can be moved away from the first valve seat 17 in order to open this connection between the space 19 and the second port 15.

A second valve element 21 cooperates with the second valve seat 18, i.e. it can be moved to contact the second valve seat 18 in order to close a connection between the space 19 and the first port 14 or it can be moved away from the second valve seat 18 to open the connection.

The first valve element 20 is moved by a magnetic drive 22. The magnetic drive 22 comprises a coil arrangement 23 and an armature 24. When the coil arrangement 23 is supplied with electric energy, the armature 24 is drawn into the coil arrangement 23 and actuates the first valve element 20 via a push rod 25 to close the opening in the first valve seat 17. In this position, the first valve element 20 contacts the second valve element 21. This is symbolized by another push rod 26. However, as will be clear from the illustration of FIGS. 7 to 9 below, such a push rod 26 is not necessary in all cases. However, when the first valve element 20 contacts the first valve seat 17, the second valve element 21 is lifted off the second valve seat 18 to open a connection between the high pressure port PP and the first pressure chamber 5.

The other magnetic valve 12 is shown in a de-energized state, i.e. the coil arrangement 23 is not supplied with electric energy so that the yoke 24 is positioned out of the coil arrangement 23. The first valve element 20 is arranged away from the first valve seat 17 and the second valve element 21 has been moved to contact the second valve seat 18 so that a connection between the high pressure port PP and the second pressure chamber 6 is interrupted and a connection between the second pressure chamber 6 and the low pressure port PT is opened.

The operation of such an electrohydraulic control valve 1 can be described as follows:

When the first magnetic valve 11 is actuated, the coil arrangement 23 of the first magnetic valve 11 is energized so that the first valve element 20 together with the first valve seat 17 interrupts a connection between the pressure chamber 5 and the low pressure port PT. At the same time a connection between the high pressure port PP and the first pressure chamber 5 is established so that hydraulic fluid from the high pressure port PP can enter the first pressure chamber 5 increasing the pressure in the first pressure chamber 5. The second magnetic valve 12 is not energized, so that a connection between the second pressure chamber 6 and the high pressure port PP is closed and a connection between the second pressure chamber 6 and the low pressure port PT is established. The control valve element 2 starts to move. The hydraulic fluid in the pressure chamber 6 can be pressed out flowing to the low pressure port PT via the second magnetic valve 12. As long as the first magnetic valve 11 is energized, the control valve element 2 is moved until it reaches an end stop. However, the movement of the control valve element 2 can be terminated before reaching the end stop. In this case, both magnetic valves 11, 12 are not energized so that there is no connection of the high pressure port PP with any of the pressure chambers 5, 6.

Figure 2:
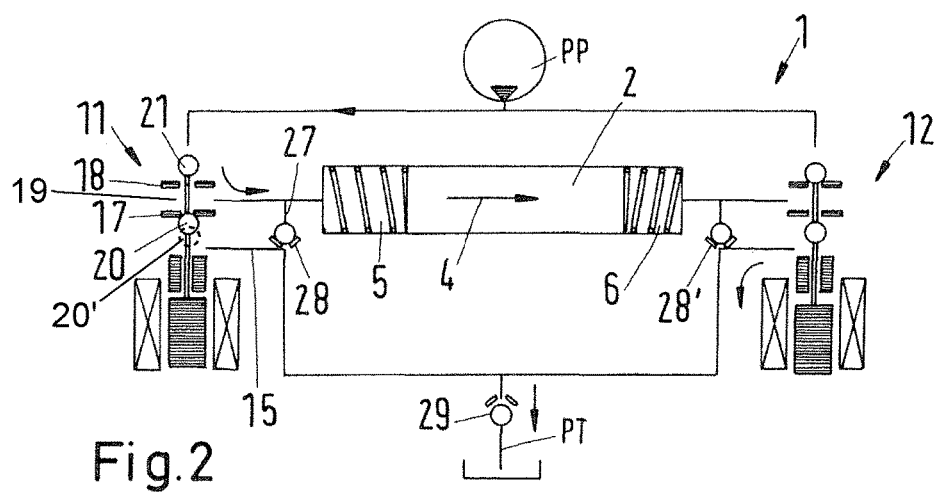
FIG. 2 shows schematically a second embodiment of the electrohydraulic control valve.

FIG. 2 shows a second embodiment of the control valve 1 in which the same elements are designated with the same numerals.

In this embodiment, each pressure chamber 5, 6 is connected by a branch line 27 to the low pressure port PT. A branch line check valve 28 is arranged in this branch line 27 opening towards the pressure chamber 5. Furthermore, a check valve 29 is provided between the two branch line check valves 28 and the low pressure port PT, said check valve 29 opening towards the low pressure port PT.

Under "normal conditions" the operation of this control valves is the same as in the embodiment of FIG. 1. However, when the pressure at the high pressure port PP falls below the pressure at the low pressure port PT, the operation of the control valve is more reliable since there is no back pressure from the low pressure port PT, but the hydraulic fluid which is pressed out of one of the pressure chambers 5, 6, for example, out of the pressure chamber 5, can flow through the second port 15 of the first magnetic valve 11 to the branch line check valve 28' opening this branch line check valve 28' and entering the second pressure chamber 6. Furthermore, in this situation (control valve element 2 is moved in a direction opposite to that shown by arrow 4) the first magnetic valve 11 is de-energized and the first valve element 20 is lifted off the first valve seat 17, as shown by the first valve element 20 moving to the position shown by 20', and the second valve element 21 is lifted off the second valve seat 18 by the pressure in the first pressure chamber, such that the first valve element 20, 20' and the second valve element 21 are moved away from each other under the influence of pressure in the space 19.

Figure 3:
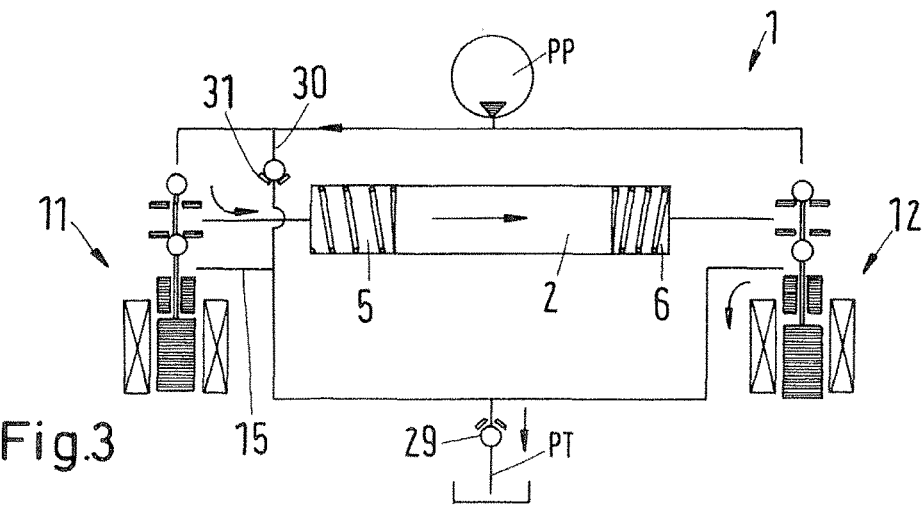
FIG. 3 shows schematically a third embodiment of the electrohydraulic control valve.

FIG. 3 shows a third embodiment of an electrohydraulic control valve 1. The same elements are designated with the same numerals.

In this embodiment there is a bypass line 30 between the high pressure port PP and the low pressure port PT. The low pressure port PT is again provided with a check valve 29 opening towards this low pressure port PT. Furthermore, this bypass line 30 is provided with a bypass line check valve 31 opening towards the high pressure port PP.

Under "normal conditions", i.e. when a pressure at the high pressure port PP is higher than the pressure at the low pressure port PT the operation is the same as in the embodiment of FIG. 1. However, under abnormal operational conditions, i.e. when the pressure at the high pressure port PP is lower than the pressure at the low pressure port PT, hydraulic fluid pressed out of the first pressure chamber 5 can escape via the second port 15 of the first magnetic valve 11 and the branch line 30 to enter the second pressure chamber 6.

Figure 4:
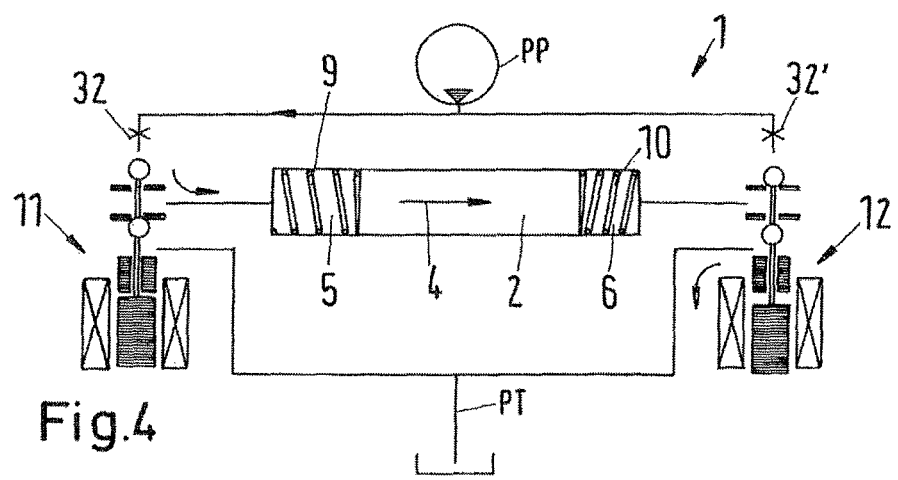
FIG. 4 shows schematically a fourth embodiment of the electrohydraulic control valve.

FIG. 4 shows a fourth embodiment of an electrohydraulic control valve 1 in which the same elements are designated with the same numerals.

In addition to the embodiment shown in FIG. 1, an orifice 32 is arranged between the high pressure port PP and the first magnetic valve 11. In a similar way, an orifice 32' is arranged between the high pressure port PP and the second magnetic valve 12.

Such an embodiment can be operated with one of the magnetic valves 11, 12 being modulated. For example, it is possible to energize the first magnetic valve 21 to increase the pressure in the first pressure chamber 5. This increasing pressure moves the control valve element 2 in the direction of the arrow 4. The second magnetic valve 12 is de-energized so that the hydraulic fluid coming out from the second pressure chamber 6 can escape to the low pressure port PT.

However, when the control valve element 2 has reached the desired position, the second magnetic valve 12 is "switched on" and "switched off" periodically. When both magnetic valves 11, 12 are energized, there is only a connection between the pressure chambers 5, 6 and the high pressure port PP and no connection between the pressure chambers 5, 6 and the low pressure port PT. Since the second spring 10 is more compressed than the first spring 9 and the pressures in the two pressure chambers 5, 6 are equal, the control valve element 2 is moved back, i.e. in a direction opposite to that shown by the arrow 4. Thereafter, the second magnetic valve 12 is de-energized again allowing to escape hydraulic fluid out of the pressure chamber 6 towards the low pressure port PT. In this way it is possible to let the control valve element 2 "swing" around a desired position.

The embodiment of FIG. 4 can be combined with the branch line 27 or the bypass line 30 shown in FIGS. 2 and 3.

Figure 5:
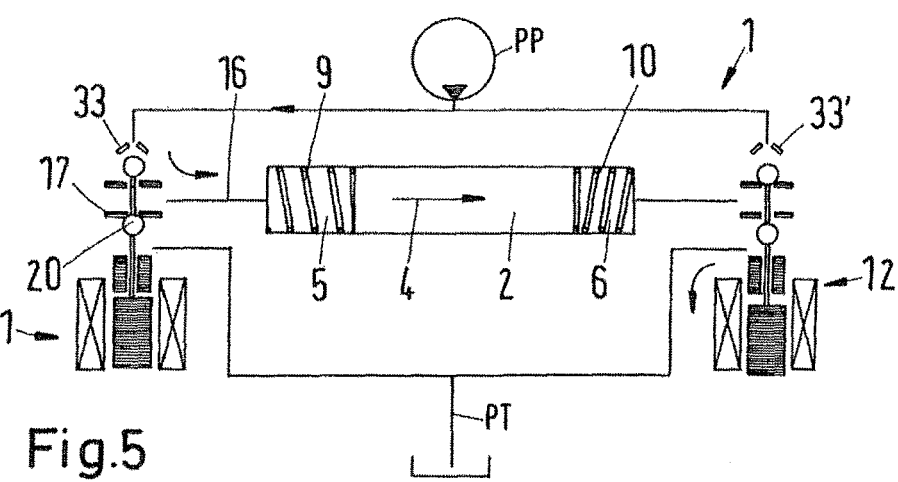
FIG. 5 shows schematically a fifth embodiment of the electrohydraulic control valve.

FIG. 5 shows a fifth embodiment of the electrohydraulic control valve 1 in which the same elements are designated by the same numerals.

In this embodiment, a pressure port check valve 33 is arranged between the high pressure port PP and the magnetic valve 11 opening towards the magnetic valve 11 in the same way, a pressure port check valve 33' is arranged between the high pressure port PP and the second magnetic valve 12.

When the first magnetic valve 11 is energized, hydraulic fluid can enter the first pressure chamber 5 since the pressure port check valve 33 is opened by the pressure at the high pressure port PP. The second magnetic valve 12 is de-energized, so that hydraulic fluid coming out of the second pressure chamber 6 can escape to the low pressure port PT.

When the desired position of the control valve element 2 has been reached, both magnetic valves 11, 12 are energized. The pressure in chamber 5 is increased because of the spring force from spring 10. This again means that the pressure in chamber 5 is equal to the pressure in chamber 6 plus the force of spring 10, in other words the pressure at the high pressure port PP plus the force of spring 10. This pressure is higher than the pressure at the high pressure port PP and the check valve 33 will close. A movement of the control valve element 2 is not possible since the hydraulic fluid cannot escape out of the first pressure chamber 5. A connection between the third port 16 of the first magnetic valve 11 and the low pressure port PT is interrupted by the first valve element 20 resting against the first valve seat 17. The connection between the third port 16 and the high pressure port PP is interrupted by the pressure port check valve 33. In this way it is possible to keep the control valve element 2 in a fixed position.

In abnormal operating conditions when the pressure at the low pressure port PT is higher than the pressure at the high pressure port PP, the control valve element 2 is blocked. The magnetic valves 11, 12 interrupt a connection between the low pressure port PT and the pressure chambers 5, 6 and the pressure port check valve 33, 33' interrupt a connection between the pressure chambers 5, 6 and the high pressure port PP so that the hydraulic fluid within the system is trapped.

Figure 6:
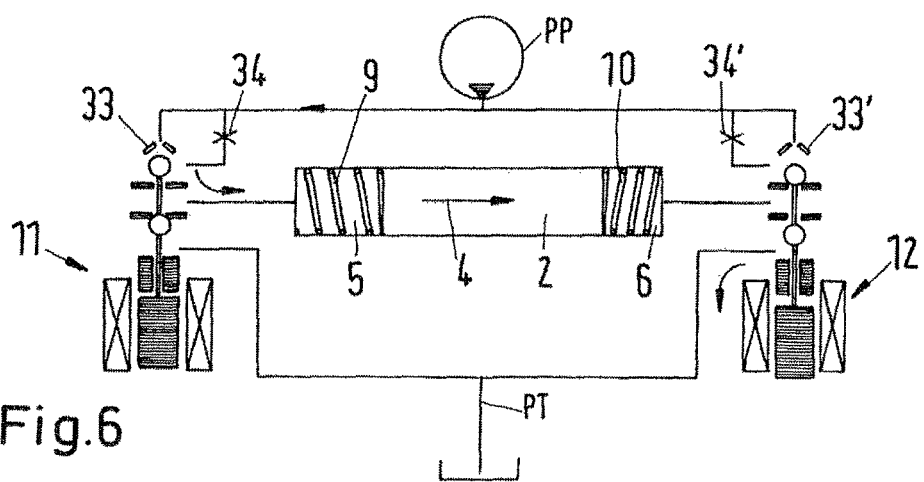
FIG. 6 shows schematically a sixth embodiment of the electrohydraulic control valve.

FIG. 6 shows a sixth embodiment in which the elements are designated with the same numerals.

The difference between the embodiment shown in FIG. 5 and the embodiment shown in FIG. 6 is that the pressure port check valve 33 is bridged by a bypass orifice 34. In the same way, the pressure port check valve 33' in the line to the second magnetic valve 12 is bridged by a bypass orifice 34'. The operation is similar to that of FIG. 4. The magnetic valve 11 is energized in order to increase the pressure in the first pressure chamber 5 while the second magnetic valve 12 is not energized allowing the hydraulic fluid escaping from the second pressure chamber 6 to reach the low pressure port PT.

When the control valve element 2 has reached the desired position, both magnetic valves 11, 12 are energized so that the control valve element 2 is moved slightly in a direction opposite to that shown by the arrow 4 due to the fact that the pressures in the pressure chambers 5, 6 are equal and the force of the second spring 10 exceeds the force of the first spring 9. The hydraulic fluid pressed out of the first pressure chamber 5 can flow through the bypass orifice 34 to reach the second pressure chamber 6. In this way it is possible to let the control valve element 2 "swing" around the desired position.

Under "abnormal" operational conditions, i.e. when the pressure at the high pressure port PP is lower than the pressure at the low pressure port PT, the control valve element 2 is locked with the aid of the check valves 33, 33'. This is true for the embodiment of FIGS. 5 and 6.

FIGS. 7A, 7B and 7C show parts of the magnetic valve 11 shown in the embodiments of FIGS. 1 to 4. The same elements are designated with the same numerals.

It can be seen that the first valve element 20 is in form of a ball. The second valve element 21 is in the form of a ball as well.

When the first magnetic valve 11 is de-energized, the push rod 25 is retracted. The second valve element 21 is pressed against a second valve seat 18 by the pressure acting in the first port 14 thereby interrupting a connection between the first port 14 and the third port 16. At the same time the first valve element 20 is lifted off the first valve seat 17 establishing a connection between the third port 16 and the second port 15 via the space 19 between the two valve seats 17, 18. In this situation the two valve elements 20, 21 contact each other so that the push rod 26 shown in FIG. 1 is not necessary. However, depending on the size of the space 19, such a push rod (or any other corresponding element) can be used.

FIG. 7B shows the situation in which the first magnetic valve 11 is energized so that the push rod 25 and correspondingly the first valve element 20 are pushed towards the first valve seat 17 thereby interrupting a connection between the second port 15 and the space 19. In this way, a connection between the second port 15 and the third port 16 is interrupted. At the same time, the first valve element 20 pushes the second valve element 21 away from the second valve seat 18 so that a connection between the first port 14 and the space 19 and the third port 16 is established.

The situation shown in FIG. 7C arises when the pressure in the pressure chamber and correspondingly in the third port 16 is larger than the pressure at the high pressure port PP and correspondingly at the first port 14. In this case, the second valve element 21 is moved farther away from the second valve seat 18 so that the two valve elements 20, 21 do not contact each other any longer.

The first port 14 can be used to form the orifice 32 just by varying the size of the first port 14.

FIGS. 8A, 8B and 8C show parts of the magnetic valve 11 used in the embodiment shown in FIG. 5. The same elements are designated with the same numerals.

FIG. 8A shows the situation in which the first magnetic valve 11 is not energized and the push rod 25 is retracted so that the first valve element 20 does not contact the first valve seat 17. A connection is established between the third port 16 and the second port 15 via the space 19.

FIG. 8B shows the situation in which the magnetic valve 11 is energized so that the push rod 25 moves the first valve element 17 to contact the first valve seat 17. In this case a connection between the second port 15 and the third port 16 is interrupted. In this situation the first valve element 20 contacts the second valve element 21 and lifts the second valve element 21 off the second valve seat 18 to establish a connection between the first port 14 and the third port 16. There is no connection between the second port 15 and the third port 16.

FIG. 8C shows the situation in which the pressure in the pressure chamber 5 and therefore the pressure in the third port 16 is larger than the pressure in the first port 14. This pressure difference presses the second valve element 21 to contact an opening 35 of the first port 14 so as to close the first port 14. It can be seen that the second valve element 21 is acting as check valve element of the pressure port check valve 33.

FIGS. 9A, 9B and 9C show parts of the magnetic valve 11 used in the embodiment of FIG. 6. The embodiment of FIGS. 9A, 9B and 9C corresponds basically to that of FIGS. 8A, 8B and 8C. The only difference is that there is a gap 36 in the wall of the opening 35 of the first port 14, i.e. an interruption of the circular line limiting the opening 35.

When the second valve element 21 comes to rest against the opening 35, there remains a flow path through the gap 36 forming the bypass orifice 34.

The solutions shown in different embodiments can be combined. For example the check valves 28 and 31 can be used in connection with the principles shown in FIGS. 5 and 6.

While the present invention has been illustrated and described with respect to a particular embodiment thereof, it should be appreciated by those of ordinary skill in the art that various modifications to this invention may be made without departing from the spirit and scope of the present.

What is claimed is:

1. An electrohydraulic control valve comprising a control valve element that is displaceable in a first direction by a pressure in a first pressure chamber and in a second direction by a pressure in a second pressure chamber, the first pressure chamber and the second pressure chamber are connected between a high pressure port (PP) and a low pressure port (PT) via a first magnetic valve and a second magnetic valve, respectively, wherein each of said magnetic valves is a three-way valve and comprises a first valve seat and a second valve seat, a space between said first valve seat and said second valve seat being connected to one of said pressure chambers and a first valve element positioned outside said space cooperates with said first valve seat and a second valve element positioned outside said space cooperates with said second valve seat, wherein said second valve element is movable by said first valve element, and wherein said first valve element and said second valve element are movable away from each other under an influence of a pressure in said space.

2. The control valve according to claim 1, wherein an orifice is arranged between said high pressure port (PP) and said second valve seat.

3. The control valve according to claim 2, wherein a branch line connects the one of said pressure chambers and said low pressure port (PT), wherein a branch line check valve is arranged in said branch line opening towards said pressure chamber.

4. The control valve according to claim 2, wherein a bypass line connects said high pressure port (PP) and said low pressure port (PT), wherein a bypass line check valve is arranged in said bypass line opening towards said high pressure port (PP).

5. The control valve according to claim 1, wherein a branch line connects said pressure chamber and said low pressure port (PT), wherein a branch line check valve is arranged in said branch line opening towards the one of said pressure chambers.

6. The control valve according to claim 1, wherein a bypass line connects said high pressure port (PP) and said low pressure port (PT), wherein a bypass line check valve is arranged in said bypass line opening towards said high pressure port (PP).

7. The control valve according to claim 1, wherein a pressure port check valve is arranged between each magnetic valve and said high pressure port (PP) opening toward each magnetic valve.

8. The control valve according to claim 7, wherein said pressure port check valve is bridged by a bypass orifice.

9. The control valve according to claim 1, wherein in a first position said second valve element protrudes through said second valve seat and contacts said first valve element, lifting said first valve element off said first valve seat.

10. The control valve according to claim 9, wherein in a second position said first valve element protrudes through said first valve seat and contacts said second valve element, lifting said second valve element off said second valve seat.

11. The control valve according to claim 10, wherein in a third position said first valve element contacts said first valve seat and said second valve element closes a connection between the one of said pressure chambers and said high pressure port (PP) at least partly.

12. The control valve according to claim 1, wherein said magnetic valve comprises a coil arrangement which is supplied with modulated electric energy.

13. The control valve according to claim 1, wherein an orifice is arranged between said high pressure port (PP) and said second valve seat.

14. The control valve according to claim 1, wherein a branch line connects the one of said pressure chambers and said low pressure port (PT), wherein a branch line check valve is arranged in said branch line opening towards said pressure chamber.

15. The control valve according to claim 1, wherein a bypass line connects said high pressure port (PP) and said low pressure port (PT), wherein a bypass line check valve is arranged in said bypass line opening towards said high pressure port (PP).

16. An electrohydraulic control valve comprising a control valve element that is displaceable in a first direction by a pressure in a first pressure chamber and in a second direction by a pressure in a second pressure chamber, the first pressure chamber and the second pressure chamber are connected between a high pressure port (PP) and a low pressure port (PT) via a first magnetic valve and a second magnetic valve, respectively, wherein each of said magnetic valves is a three-way valve and comprises a first valve seat and a second valve seat, a space between said first valve seat and said second valve seat being connected to one of said pressure chambers and a first valve element positioned outside said space cooperates with said first valve seat and a second valve element positioned outside said space cooperates with said second valve seat, and wherein in a first position said second valve element protrudes through said second valve seat and contacts said first valve element, lifting said first valve element off said first valve seat.

17. The control valve according to claim 16, wherein in a second position said first valve element protrudes through said first valve seat and contacts said second valve element, lifting said second valve element off said second valve seat.

18. The control valve according to claim 17, wherein in a third position said first valve element contacts said first valve seat and said second valve element closes a connection between the one of said pressure chambers and said high pressure port (PP) at least partly.

* * * * *